United States Patent Office 2,815,714
Patented Dec. 10, 1957

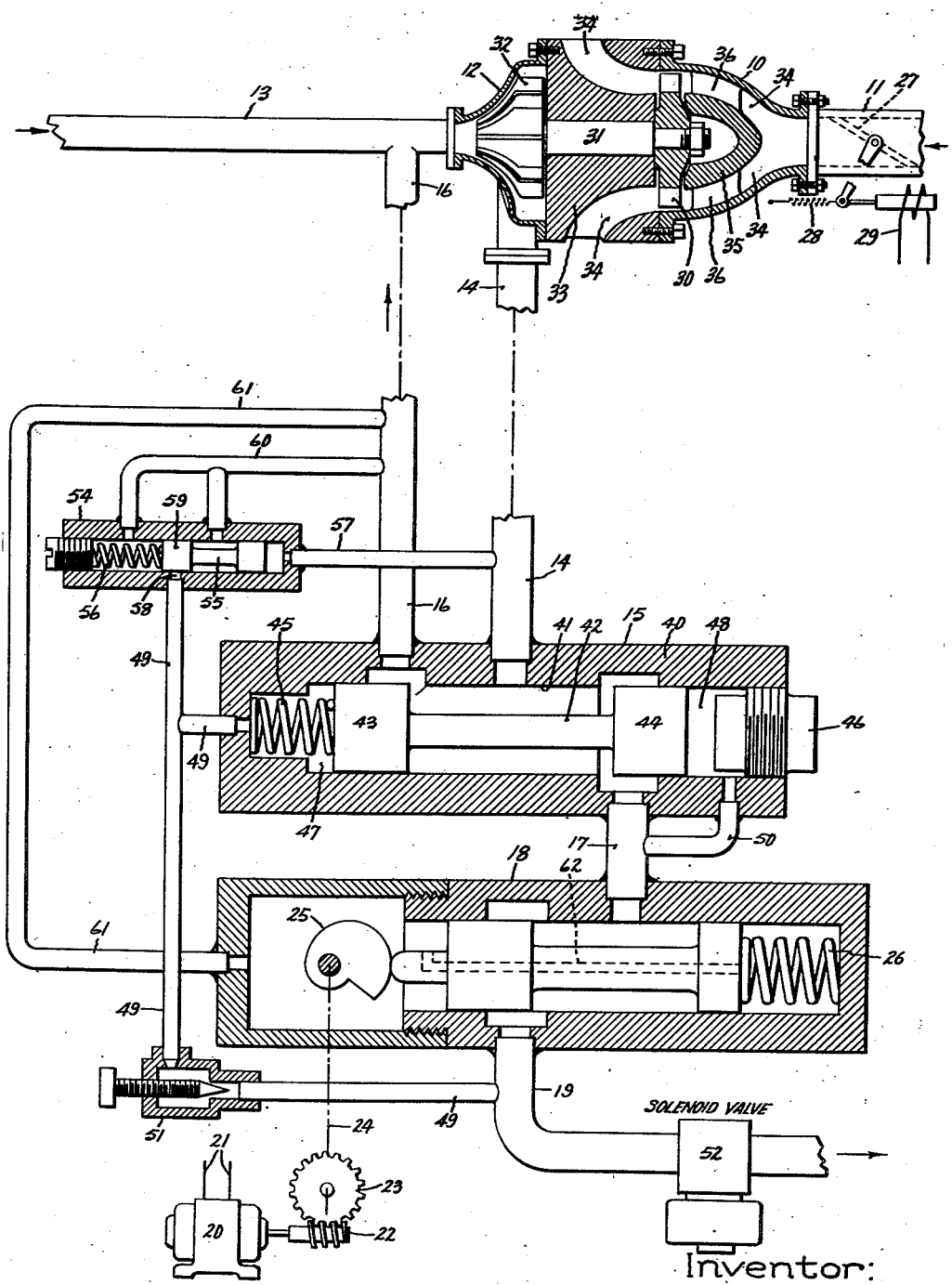

2,815,714

LIQUID FLOW DELIVERY SYSTEM

John W. Jacobson, Schenectady, N. Y., assignor to General Electric Company, a corporation of New York Application December 29, 1951, Serial No. 264,103

8 Claims. (Cl. 103—42)

This invention relates to an improved liquid flow delivery system and more particularly to such a system which is especially adapted for employment with a liquid pump which must be continuously operated with an appreciable discharge pressure regardless of flow delivery requirements.

In certain applications such, for instance, as in fuel systems for liquid fuel burning power plants, it is sometimes desired that a liquid shall be delivered at a predetermined adjustable rate of flow, regardless of other factors which may vary and which would normally influence the rate of flow such as varying rates of liquid delivery from a pump, or other source of liquid, and varying back pressures from the apparatus to which liquid is supplied. One type of system which has been used to provide this function in the past includes a throttling valve for setting a flow area through which the liquid must pass in order to determine the liquid flow rate, and a by-pass valve connected in parallel with the throttle valve to maintain a constant pressure drop across the throttle valve so as to assure that the flow rate through the throttle valve is always substantially proportional to the throttle valve opening. One system of that type is disclosed in co-pending Patent Number 2,781,049, issued February 12, 1957, to Robert S. Binford and John W. Jacobson for a Liquid Flow Control Valve System, which is assigned to the same assignee as the present application.

Prior systems of this type have generally been employed with pumps which have a specific speed limitation such as by a direct driving connection from a larger machine, perhaps the one to which liquid is being delivered. It is now proposed, however, to employ a pump which is driven by a fluid expansion motor, such as a turbine, operating from the energy supplied by a compressed gas which expands through the turbine. A difficulty which is encountered in such a system is that if there is no load on the pump, that is, no discharge pressure, the pump speed tends to increase dangerously if a relatively limitless supply of compressed gas is available for the pump driving turbine.

Accordingly, it is an object of this invention to provide a liquid flow delivery system which is especially adapted for the incorporation of a fluid expansion driven pump in which the maximum speed can be maintained within a safe range regardless of variations in the supply of motive fluid to the pump motor and regardless of variations in the quantity of liquid flow required from the system.

A further object of this invention is to provide an improved liquid flow delivery system incorporating a fluid expansion motor driven pump in which a back pressure is continuously maintained upon the pump, regardless of other variable operating conditions, in order to limit pump speed to a predetermined desired maximum.

Another object of this invention is to provide an improved liquid flow delivery system including a fluid expansion motor driven pump and valve system including a throttle valve for setting a flow area in accordance with a desired liquid flow rate, and an improved pressure regulating valve which constantly limits pump flow to maintain at least a minimum pump discharge pressure as well as regulating the pressure across the throttle valve.

In a system such as the one described, it is desired to employ a fluid expansion motor and pump which are no larger than necessary to provide a maximum volume of liquid flow required. The size, weight, and cost of the pump can thereby be minimized. However, in a system having continuous maintainance of pump discharge pressure in which the volume of delivery required from the pump, and the fluid supplied to the motor may vary over wide limits, a substantial danger of destructively high pump discharge pressures may exist.

Accordingly, it is a further object of this invention to provide an improved liquid flow delivery system employing a fluid expansion motor driven pump with a pump discharge pressure continuously maintained to prevent overspeeding in which the discharge pressure is not permitted to enter the dangerous range in which overpressure destruction of the pump might occur.

Another object of this invention is to provide a liquid flow delivery system employing a pressure regulating valve for maintaining a constant pressure across a throttle orifice, and at the same time serving to maintain a continuous discharge pressure on the fluid expansion motor driven liquid pump in a range which at all times is great enough to prevent overspeed destruction of the pump and low enough to prevent overpressure destruction of the pump, regardless of extreme variations in the volume and pressure of the motive fluid supplied to the fluid motor driving the pump, and in the output required from the pump.

Even when the input of motive fluid to a system such as described above it insufficient to cause destructively high pump pressures, excessive pump pressures may cause unstable pump operation.

It is therefore a further object of this invention to provide a liquid flow delivery system employing a fluid expansion motor driven liquid pump in which pump pressure is constantly maintained to prevent overspeeding but in which the maximum pump pressure is limited to the stable range of pump operation.

In a fluid expansion motor driven liquid pump, where the pressure of the fluid may vary over wide limits to which the liquid flow delivery system must accommodate itself, increased motor fluid input generally causes an increased pump speed and a corresponding increase in the volume of liquid delivered by the pump. Under such conditions of high pump delivery rates, if a very low delivery rate is required of the system, an inconveniently large and uneconomical by-pass valve arrangement must be provided in order to by-pass the portion of liquid delivered by the pump which is not required from the system.

Accordingly, it is a further object of the present invention to provide an improved liquid flow delivery system including a pump flow limiting divider valve for accomplishing the double function of by-passing the amount of liquid delivered from the pump and not required from the liquid delivery system, and for concurrently throttling the flow of liquid to the portions of the system beyond the flow limiting divider valve to thereby limit the liquid delivery of the system and to assist in forcing unrequired pumped liquid into the by-pass outlet to thereby permit employment of smaller valve components.

A further problem in design and operation of fluid flow delivery systems of the general type described above, in which a pressure sensitive valve is provided for automatically maintaining a constant pressure across a throttling valve, arises from the fact that a biasing spring is generally the most convenient means for determining the pressure which is to be held. It will be obvious that this pressure should be held at a constant value within limits as narrow as possible. Unfortunately, however, in employing a spring, the normal spring gradient, in which the force required to deflect the spring increases with greater deflection, causes a change or "regulation" in the so-called "constant" pressure which is held with various openings of the pressure sensitive valve.

Accordingly, it is a further object of this invention to provide an improved liquid flow delivery ssytem in which a pressure sensitive valve holds a pressure constant across a throttle valve employing an improved pressure sensitive valve structure having a double action characteristic including a simultaneous variation in a by-pass orifice and in a throttling orifice in opposite directions to control the by-passing of unrequired liquid delivered from a pump with a minimum of movement of the pressure sensitive valve whereby the spring gradient "regulation" is minimized.

A further object of this invention is the provision of an improved liquid flow delivery system employing a fluid expansion motor driven liquid pump in which the energy input to the motor is limited by the liquid flow delivery system by the continuous maintenance of a back pressure on the pump, restraining unlimited pumping movement to thereby limit flow of the motive fluid supplied to the pump motor.

A further object of the present invention is the provision of an improved liquid flow delivery system employing a delivery rate controlling throttle valve, and a constant pressure regulating valve for maintaining a constant pressure drop across the throttle valve, in which means are provided for emergency over-pressure relief at an accurately determined maximum permissible liquid pump pressure, in which the pressure regulating valve also performs the functions of an over-pressure relief valve.

Accordingly, in carrying out the objects of this invention, a system may be employed including a centrifugal liquid pump which is driven by a turbine motor supplied by motive fluid such as a compressed gas from a pressure vessel. An adjustable throttle valve is connected between the pump and the apparatus to which liquid is being delivered. A constant pressure regulating, double action, pump flow limiting divider valve is connected between the liquid pump and the throttle valve and includes control pressure lines connected to the inlet and outlet conduits of the throttle valve for actuation to maintain a constant pressure across the throttle valve, the magnitude of the "constant" pressure being determined by the force exerted by a valve biasing spring; the pump flow limiting valve having concurrently actuable by-pass flow control and direct flow control valve elements.

For a more complete understanding of this invention, reference should be made to the following specification and the accompanying drawing which is a schematic representation of a preferred embodiment of this invention.

Referring more particularly to the drawing, there is shown a fluid expansion motor in the form of a turbine 10 which is connected to a conduit 11 for receiving a supply of motive fluid such as a suitable gas under pressure. The motor 10 is connected to drive a centrifugal pump 12 which pumps fluid from an inlet conduit 13 to a pump outlet conduit 14. The conduit 14 connects to a pump flow limiting valve 15 for the supply of the pumped liquid under pressure thereto. The pump flow limiting valve 15 is connected to divide the pump flow between a return conduit 16, for returning a portion of the pumped fluid to the pump inlet conduit 13, and the conduit 17 for conveying a portion of the pumped liquid to a throttle valve 18. A throttle valve outlet conduit 19 is connected to throttle valve 18 for conveying the portion of fluid passed by throttle valve 18 to the device or apparatus in which the pumped liquid is to be used (not shown). An electric positioning motor 20 which may be energized through electrical connections 21 from a suitable automatic or manually controllable electrical system (not shown) is provided for adjusting the discharge area of the throttle valve 18 by means of a worm and pinion 22 and 23, a drive shaft schematically shown at 24 and a valve piston adjusting cam 25.

As will be more fully described below, the pump flow limiting valve 15 automatically maintains a substantially constant pressure across the throttle valve 18 in order to assure a volume of flow from the fluid delivery system which is proportional to the throttle opening area. The pump flow limiting valve 15 also constantly maintains a back pressure on the pump 12.

In the conduit 11, which supplies motive fluid to the fluid expansion motor 10, a simple shut-off valve 27 may be provided which is normally spring biased into the closed position by means such as the tension spring 28 and including a solenoid 29 for opening the valve 27 when operation of the apparatus is required. It will be seen that the pump motor 10 includes a turbine wheel 30 which is connected by means of a shaft 31 to drive the rotor 32 of pump 12. As shown, the turbine and pump housing may be a common structure 33, the central portion of which provides a journal bearing for the common turbine rotor and pump shaft 31. The housing 33 may also provide suitable motive fluid passages 34 and suitable baffles 35. Suitable fixed turbine blading 36 may also be provided as is well known in the art.

The pump flow limiting valve 15 is seen to include a housing 40 having a cylindrical bore 41 in which a piston 42 having end lands 43 and 44 is reciprocally mounted. Piston 42 is biased to the right in the diagram by a compression spring 45. In the normal inoperative position, biasing spring 45 would force end land 44 over against the stop formed by the plug 46 which closes the right end of the pump flow limiting valve. For added clarity in the explanation of the operation of this valve, however, piston 42 is shown in a typical operating position. It will be seen that in the operating position shown, the liquid from pump 12 supplied through conduit 14 to valve 15 will be divided into two streams, one returning through conduit 16 to the inlet conduit 13 of the pump 12; and the other through conduit 17 to the throttle valve 18. The position of valve piston 42 and the flow dividing ratio is determined by control pressures in the end chambers 47 and 48. These chambers are respectively maintained at the outlet and inlet liquid pressures of the throttle valve 18. The chamber 47 is connected for this purpose to the throttle valve outlet conduit 19 by means of control pressure line 49, and chamber 48 is connected for this purpose to conduit 17, the inlet conduit of throttle valve 18, by means of a control line 50. The pump flow limiting valve 15 is therefore positioned by the throttle valve outlet pressure within chamber 47 and the force of biasing spring 45 in opposition to the throttle valve inlet pressure within chamber 48. It will be seen that a constant difference is maintained between the two fluid pressures which is determined by the force of the biasing spring 45 (and the cross-sectional area of valve bore 41). If the inlet pressure becomes too high in relation to the outlet pressure, valve piston 42 is forced to the left, by-passing a greater portion of the output of pump 12 past valve land 43 and into the return conduit 16, and throttling the passage of the pumped fluid from pump 12 at land 44 to decrease the amount of fluid passed to conduit 17. Conversely, if the discharge pressure in chamber 47 becomes too high, the piston moves in the other direction to correct that condition. An adjustable needle valve 51 may be connected in series in the sensing line 49 in order to stabilize the operation of this system by limiting the rate at which fluid can flow to or from chamber 47 through sensing line 49 to limit the rate of displacement of piston 42.

In order to be sure that none of the liquid from this system is transmitted to the apparatus in which it is to be used when such liquid is not desired, a solenoid valve 52 may be provided in the outlet conduit 19 in order to establish a positive shut-off when required.

The subject system also includes an over-pressure relief pilot valve 54 which includes a piston 55 normally biased to a closed position by biasing spring 56. This over-pressure relief pilot valve 54 is connected by means of a pressure sensing line 57 to the pump discharge conduit 14 to detect an over-pressure condition of the pump. If such an over-pressure condition should occur, piston 55 is forced open against the bias of spring 56, opening a valve port 58 which is normally closed by a land 59 of piston 55 to relieve the pressure within the pressure sensing line 49 through a connection from line 49 to the port 58. Relief of this pressure is accomplished through a pilot valve pressure relief line 60 which is connected to the low-pressure conduit 16 returning to the low pressure inlet conduit 13 of the pump 12. It will be seen that since pilot valve 54 is connected at one end to the pump inlet, and at the other end to the pump outlet, it is truly sensitive to the pressure provided by the pump, even though general pressure levels may vary.

A low-pressure line 61 is also provided for the throttle valve 18 in order to form an outlet for liquid which may leak past the lands of the throttle valve 18. A center bore 62 is provided for communication of the right end of throttle valve 18 with this low-pressure drain line in order to prevent pressure build up within the ends of the throttle valve 18.

In the operation of the over-pressure relief pilot valve 54 on pump over-pressure conditions the port 58 is opened to discharge the pressure within line 49. This causes an immediate reduction in the pressure in chamber 47 of the pump flow limiting valve 15, allowing piston 42 to move to the left, by-passing more of the pumped liquid into the low-pressure by-pass conduit 16 and limiting the passage of additional fluid to the conduit 17 into the throttle valve 18. In this way, the combination of pilot valve 54 and the pump flow limiting valve 15 together act as a two-stage over-pressure relief system. The valve 15 therefore performs an over-pressure relief function in addition to the functions previously described. Of course, under these emergency over-pressure conditions, the "constant pressure" maintained across the throttle valve is disturbed. It will be obvious that the flow limiting orifice provided by the needle valve 51 in the pressure line 49 permits a rapid and relatively complete dissipation of the pressure within chamber 47 upon operation of the pilot valve 54 by preventing a rapid replenishment of liquid under pressure from the discharge conduit 19.

From the above description, it will be seen that the objectives set forth above for this invention have clearly been met. It is known that a fluid expansion motor such as a turbine which is supplied with a relatively unlimited amount of motive fluid may over-speed to an extent sufficient to destroy itself if no retarding forces are available in the form of a suitable load. Accordingly, where little or no liquid delivery is required from outlet conduit 19, but the motive fluid supplied through conduit 11 to fluid expansion motor 10 is relatively unlimited, the flow of liquid which is pumped through conduit 14 and permitted to pass into conduit 17 is positively limited by the land 44 of pump flow limiting valve 15 to an amount sufficient only to maintain the predetermined constant pressure across the throttle valve 18. Since this positive limitation of flow is imposed by valve land 44, the valve land 43 can also partially throttle the flow of the remainder of the fluid which is pumped through pump outlet conduit 14 so as to maintain a certain amount of back pressure on the pump 12 in the conduit 14 and within the central bore of valve 15, no matter what the liquid flow requirements of the system are. By thus maintaining a continuous back pressure, and a continuous load, on the pump 12, over-speed conditions of the pump and turbine motor are avoided. Valve 15 may be accurately characterized therefore as a constant pressure regulating double action, pump flow limiting divider valve since it obviously is double acting to divide the pump flow to regulate a constant throttle valve pressure while limiting total pump flow.

The discharge pressure on pump 14 cannot be maintained at too high a value since over-pressure destruction of the pump 12 may result. Also it is not normally desirable that the emergency over-pressure relief system, including the over-pressure pilot valve 54, should become operative, destroying the "constant pressure" otherwise maintained by valve 15 across throttle valve 18. Also, even at pressure levels below the range where over-pressure destruction of the pump may result, and below the level at which the emergency over-pressure relief system would become operative, during conditions of operation at low levels of motive fluid input to the fluid motor 10, maintenance of too high a pump discharge pressure may result in unstable pump operating conditions. Accordingly, the openings at valve lands 43 and 44 of pump flow limiting valve 15 are preferably designed so that under the extreme condition of maximum input of motive fluid through conduit 11 to fluid expansion motor 10, a sufficient total flow of liquid is permitted through pump flow limiting valve 15 to prevent pump 12 from exceeding the maximum safe pressure. This condition is maintained regardless of the amount of liquid flow scheduled by throttle valve 18 and the resultant position of by-pass valve piston 42. Such a design will also prevent over-pressure conditions which would result in unstable pump operating conditions, as mentioned above. As there may be considerable back pressure on outlet conduit 19 and a resulting higher pressure on conduit 17 interconnecting valves 15 and 18, and practically no pressure in pump return conduit 16, it will be seen that the position of valve piston 42 would normally have an appreciable effect on the discharge pressure held on the pump 12, as the opening of the valve orifice at valve land 43 into the low pressure discharge conduit 16 would have a greater pressure dissipating effect than the opening of the orifice at valve land 44 into the higher pressure conduit 17. However, this valve is preferably so designed that a given axial movement of the valve piston 42 provides a smaller orifice area change at land 43 than at land 44 and the design is preferably chosen so as to maintain the pump discharge pressure at approximately the maximum permissible pressure value, regardless of the axial position of valve piston 42, under the extreme condition of maximum input of motive fluid through conduit 11 to fluid expansion motor 10. Maintenance of maximum pump outlet pressure under these conditions is obviously desirable in order to obtain the maximum speed limitation effect on the pump 12. The dissimilar scheduling of the orifices at valve lands 43 and 44 may be obtained by providing a smaller area of cut-out portion in the valve bore 41 at the valve land 43 where the smaller opening area is desired for a given axial movement of the valve piston.

Even if it were not for the advantages pointed out above in the system of the present invention in limiting the pump speed and pump pressure in order to avoid destruction or unstable operation of the pump, there is a distinct advantage in the maintenance of a constant pressure on the pump 12, for by thus limiting the speed of pump 12, the volume of fluid flow is reduced over what it would be if a lower pump pressure were maintained. For this reason, a smaller volume of liquid need be handled by the valve 15 in order to maintain the "constant pressure" across throttle valve 18 and a smaller valve structure is adequate. An inter-related factor in the pump flow limiting valve operation which permits a smaller valve structure exists in the throttling of liquid at land 44 when a reduction in liquid flow from valve 15 to valve 18 is required. This, in effect, forces an increased flow of fluid through the orifice at land 43. The orifice at land 43 and the entire valve structure in that area of valve 15 may be smaller than it would otherwise have to be in order to handle a given volume of liquid flow. The employment of this pump flow limiting valve structure therefore permits greatly reduced valve dimensions over those which have been previously known.

Further, by maintaining a constant back pressure on the liquid pump 12, which is greater than back pressures generally maintained in prior liquid delivery systems, the power consumption of the pump 12 is limited, and the power input to fluid expansion motor 10 is therefore limited. Under these conditions, it will be obvious that the fluid expansion motor has an appreciable throttling effect so as to limit the amount of motive fluid discharged through the turbine and to the atmosphere through discharge passages 34. The system thereby prevents unnecessary dissipation of the motive fluid available from he conduit 11.

It will also be seen that the pump flow limiter valve 15 is a double action device in maintenance of a constant pressure across throttle valve 18, since a movement of valve piston 42 to the left, in correcting the pressure to a lower value, for instance, not only causes a greater opening at the land 43 to permit by-passing of a greater portion of the liquid delivered by pump 12, but there is also a concurrent closing movement of valve land 44, cutting down the orifice through which the fluid which is pumped may be delivered through conduit 17 to the throttle valve 18. This double action characteristic obviously permits a much more sensitive and effective regulating action for a given amount of valve movement than has been known in prior systems. One advantage of this is that a smaller valve movement permits a more compact valve design. Also, a smaller range of movement means a smaller range of compression for the biasing spring 45 is required so that the gradient in spring force does not cause as much "regulation" in the "constant pressure" calibration of the valve 15 as would be experienced in prior art systems.

It will be seen from the above that the applicant has provided a new and improved liquid delivery system having a number of distinct advantages over prior art systems and a system which is particularly well adapted for incorporation of a fluid expansion motor driven pump. While a particular embodiment of this invention has been shown, it will be understood that various changes and modifications will occur to those skilled in the art without departing from the spirit and scope of the present invention. It is therefore contemplated that the appended claims will cover any such modifications as fall within the true spirit and scope of this invention.

What I claim as new and desire to secure by Letters Patent of the United States is:

1. A combined flow control and speed control system for a fluid expansion motor driven liquid pump comprising a pump flow limiting valve connected to the discharge of said pump to limit the speed thereof, said valve including two liquid discharge openings for dividing the output of said pump, a connection from one of said openings to a low pressure return line and a conduit from the other of said openings for connection to apparatus to which the pumped liquid is to be supplied, said valve including a valve piston connected for movement in response to pumped liquid pressures downstream from said conduit discharge opening for concurrently adjusting the flows to said two outlet openings in opposite senses to thereby control the rate of liquid delivery of the system.

2. In a liquid flow delivery system of the type employing a throttle valve positionable to determine the volume of delivery of the system and a pressure-sensitive valve for maintaining a constant pressure across the throttle valve, a fluid expansion motor driven liquid pump, an improved pressure-sensitive valve connected between said pump and the throttle valve, said pressure-sensitive valve including a low pressure discharge orifice through which unrequired pumped liquid may be passed, and a second discharge orifice communicating with said connection to the throttle valve, said pressure-sensitive valve including a valve piston for simultaneously controlling the openings of said orifices respectively in opposite directions to maintain a constant pressure across the throttle valve by regulation of the liquid flow thereto, at least one of either of said orifices being at least partially closed at all times to limit the discharge flow of said pump to prevent pump overspeed conditions.

3. A liquid flow delivery system comprising a fluid expansion motor driven liquid pump, a pump flow limiting valve connected to receive and limit the entire liquid discharge from said pump, said flow limiting valve including a valve element for dividing pump flow between a first valve discharge orifice and a second valve discharge orifice, a valve piston for simultaneously controlling the openings of said orifices in opposite directions so that the sum of the areas of said orifices never exceed a predetermined maximum value in order to prevent pump overspeed conditions, a throttle valve, a connection from one of said discharge orifices to an inlet of said throttle valve for conveying liquid thereto, pressure sensing lines connected respectively to said inlet and an outlet of said throttle valve and to the respective ends of said flow limiting valve for positioning of said flow limiting valve to maintain a predetermined pressure across said throttle valve by regulation of the flow of liquid from said flow limiting valve to said throttle valve.

4. A liquid delivery system comprising a fluid expansion motor driven liquid pump, an adjustable throttle valve connected to throttle the output of said pump to obtain a system delivery in accordance with the position of said valve, a pump flow limiting divider valve connected between said pump and said throttle valve, a connection from said pump flow limiting valve to a low pressure container, a piston within said pump flow limiting valve, pressure sensing lines respectively connected from the output and input conduits of said throttle valve to said pump flow limiting valve for communication with the ends of said piston for movement thereof in response to the total difference in pressures across said throttle valve, said pump flow limiting valve including discharge orifices respectively communicating with said low pressure container connection and the connection from said pump flow limiting valve to said throttle valve, said piston including valve lands positioned for varying said orifices in opposite senses for regulation of the division of pump flow for maintenance of a predetermined pressure across said throttle valve, the combined openings at said orifices never exceeding a maximum value for limiting pump flow for prevention of pump overspeed.

5. A system for delivery of a liquid at a predetermined adjustable flow rate, comprising a liquid pump, a pump flow limiting valve connected to the discharge end of said pump, said valve having two outlets to which the flow of said pump is divided, a connection from the first of said outlets to the low pressure inlet side of said pump, a throttle valve, a connection from the second of said outlets to said throttle valve for delivery of a portion of said liquid from said pump flow limiting valve to said throttle valve, said throttle valve including a discharge outlet for connection for delivery of liquid at a rate determined by the setting thereof to apparatus to be supplied by said system, said pump flow limiting valve including a piston having lands arranged to alternatively reduce the flow area to either of said outlets thereof, a pressure sensing line extending from said throttle valve discharge outlet to one end of said pump flow limiting valve for bias of said piston in a first direction to increase the area of said first flow limiting valve outlet and to decrease the area of said second flow limiting valve outlet, a spring device connected to bias said piston in said first direction, a second pressure sensing line connected from said second flow limiting valve discharge outlet to the opposite end of said flow limiting valve for bias thereof in the direction opposite to said first direction.

6. An adjustable liquid delivery system comprising a centrifugal liquid delivery pump, a fluid expansion driven turbine connected for driving said pump, an adjustable throttle valve connected to throttle the output of said pump, an electrical positioning motor connected to said throttle valve for positioning adjustment thereof for providing adjustable liquid deliveries from the system, a pump flow limiting valve connected between said pump and said throttle valve and including a low pressure discharge outlet, said pump flow limiting valve including a piston having valve lands arranged to continuously limit the output of said pump to maintain a back pressure thereon and for dividing the liquid flow from said pump between said throttle valve and said low pressure discharge outlet, a spring for biasing said piston in a direction for decreasing the division of flow to said low pressure discharge outlet and increasing the division to said throttle valve, a first pressure sensing line connected from the output of said throttle valve to one end of said pump flow limiting valve for bias of said piston in the direction assisting said biasing spring, said line including a flow limiting stabilizing orifice, a second pressure sensing line connected from the inlet of said throttle valve to said pump flow limiting valve for bias of said piston in opposition to said biasing spring, an overpressure relief pilot valve spring biased to a closed position and including pressure sensing lines connected to the input and output of said pump for opening operation thereof in response to an overpressure condition of said pump, a connection from said pilot valve to the end of said pump flow limiting valve connected by said first-mentioned pressure sensing line, said pilot valve including a pressure exhausting valve opening arranged with said last named connection to relieve the pressure in said first-mentioned sensing line upon operation of said pilot valve to relieve the bias on said piston imposed thereby.

7. A liquid flow delivery system comprising a valve connected to receive the entire liquid input of the system, said valve including a valve element for dividing liquid input flow between a first valve discharge orifice and a second valve discharge orifice, a connection from said valve to a throttle valve for conveying the liquid from one of said discharge orifices to said throttle valve, said other discharge orifice providing a low pressure relief opening, pressure sensing lines connected respectively to the input and output conduits of said throttle valve and to the respective ends of said first named valve for positioning thereof to maintain a predetermined pressure across said throttle valve by regulation of the flow of liquid from said first named valve to said throttle valve, a pilot valve connected to measure an excessive liquid input pressure for opening operation of a low pressure discharge port thereof in response thereto, and a connection from said last named discharge port to the end of said first named valve communicating with the output conduit of said throttle valve for pressure relieving operation of said first named valve by opening of said other discharge orifice in response to operation of said pilot valve.

8. An adjustable liquid delivery system comprising an adjustable throttle valve for setting a desired liquid flow rate, a flow divider valve connected between a source of liquid and said throttle valve and including a low pressure discharge outlet, said flow divider valve including a piston having valve lands for dividing the liquid flow from said source between said throttle valve and said low pressure discharge outlet, a spring for biasing said piston in a direction for decreasing the division of flow to said low pressure discharge outlet and increasing the division to said throttle valve, a first pressure sensing line connected from the output of said throttle valve to one end of said flow divider valve for bias of said piston in the direction assisting said biasing spring, said line including a flow limiting stabilizing orifice, a second pressure sensing line connected from the inlet of said throttle valve to said flow divider valve for bias of said piston in opposition to said biasing spring, an overpressure relief pilot valve spring biased to a closed position and including a pressure sensing line connected to the input of said flow divider valve for opening operation in response to an overpressure condition, a connection from said pilot valve to the end of said flow divider valve connected by said first-mentioned pressure sensing line, said pilot valve including a pressure exhausting valve opening arranged with said last named connection to relieve the pressure in said first-mentioned sensing line upon operation of said pilot valve to relieve the bias on said piston imposed thereby.

References Cited in the file of this patent

UNITED STATES PATENTS

| | | |
|---|---|---|
| 1,467,522 | Amsler | Sept. 11, 1923 |
| 2,103,299 | Ravnsbeck | Dec. 28, 1937 |
| 2,445,544 | Trautman | July 20, 1948 |
| 2,462,983 | MacDuff et al. | Mar. 1, 1949 |
| 2,470,382 | Vanni | May 17, 1949 |
| 2,545,684 | Carson et al. | Mar. 20, 1951 |
| 2,545,856 | Orr | Mar. 20, 1951 |
| 2,573,231 | Teague | Oct. 30, 1951 |
| 2,624,283 | Hirvonen | Jan. 6, 1953 |